US012560934B2

(12) United States Patent
Iwase

(10) Patent No.: US 12,560,934 B2
(45) Date of Patent: Feb. 24, 2026

(54) ROUTE SETTING METHOD, AUTONOMOUS TRAVELING METHOD, ROUTE SETTING DEVICE, AUTONOMOUS TRAVELING SYSTEM, AND STORAGE MEDIUM

(71) Applicant: Yanmar Holdings Co., Ltd., Osaka (JP)

(72) Inventor: Takuya Iwase, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 101 days.

(21) Appl. No.: 18/268,958

(22) PCT Filed: Dec. 3, 2021

(86) PCT No.: PCT/JP2021/044467
§ 371 (c)(1),
(2) Date: Jun. 21, 2023

(87) PCT Pub. No.: WO2022/138071
PCT Pub. Date: Jun. 30, 2022

(65) Prior Publication Data
US 2024/0077876 A1 Mar. 7, 2024

(30) Foreign Application Priority Data
Dec. 22, 2020 (JP) ................................. 2020-211919

(51) Int. Cl.
*G05D 1/00* (2024.01)
*A01B 69/04* (2006.01)

(52) U.S. Cl.
CPC ......... *G05D 1/0219* (2013.01); *A01B 69/008* (2013.01)

(58) Field of Classification Search
None
See application file for complete search history.

(56) References Cited

U.S. PATENT DOCUMENTS

2019/0146513 A1 5/2019 Tomita et al.

FOREIGN PATENT DOCUMENTS

| JP | H09-154315 A | 6/1997 |
|---|---|---|
| JP | 2018055180 A | 4/2018 |
| JP | 6440647 B2 | 12/2018 |
| JP | 2019-174890 A | 10/2019 |
| KR | 20190096956 A | 8/2019 |
| WO | 2018-042853 A1 | 3/2018 |
| WO | 2018-055922 A1 | 3/2018 |

(Continued)

OTHER PUBLICATIONS

Japanese Office Action dated Jan. 4, 2024 issued in JP Application 2020-211919.

(Continued)

*Primary Examiner* — Tamara L Weber
(74) *Attorney, Agent, or Firm* — NORTON ROSE FULBRIGHT US LLP

(57) ABSTRACT

A route setting device includes a situation ascertainment unit and a departure route setting unit. The situation ascertainment unit receives an instruction for a work vehicle moving through a field along a preset work route, and acquires the location of the work vehicle. On the basis of the instruction and the work machinery used for work in the field by the work vehicle moving within the field, the departure route setting unit generates a departure route for departing from a work region where work is being done by the work vehicle in the field.

11 Claims, 11 Drawing Sheets

(56)     References Cited

FOREIGN PATENT DOCUMENTS

| WO | 2019-124174 | A1 | 6/2019 |
| WO | 2019-124273 | A1 | 6/2019 |
| WO | 2020/235471 | A1 | 11/2020 |

OTHER PUBLICATIONS

International Search Report dated Jan. 18, 2022 issued in corre-
sponding PCT Application PCT/JP2021/044467.
Extended European Search Report dated Sep. 24, 2024, issued in EP
Application No. 21910223.3.

ROUTE SETTING METHOD, AUTONOMOUS TRAVELING METHOD, ROUTE SETTING DEVICE, AUTONOMOUS TRAVELING SYSTEM, AND STORAGE MEDIUM

CROSS-REFERENCE TO RELATED APPLICATIONS

This application is a national stage application pursuant to 35 U.S.C. § 371 of International Application No. PCT/ JP2021/044467, filed on Dec. 3, 2021, which claims priority under 35 U.S.C. § 119 to Japanese Patent Application No. 2020-211919 filed on Dec. 22, 2020, the disclosures of which are hereby incorporated by reference in their entireties.

TECHNICAL FIELD

The present invention relates to a route setting method, an autonomous traveling method, a route setting device, an autonomous traveling system, and a storage medium.

BACKGROUND ART

Recently, studies have been conducted on autonomous traveling systems which perform farmwork as a result of the autonomous traveling systems automatically moving within a field.

Patent Literature 1 (JPH09-154315 A) discloses a control device for which a position for replenishment of materials or discharge of the harvest is set in advance in a field, and by which a work vehicle that is working within the field is moved to the set position on the basis of an instruction by a worker.

Patent Literature 2 (JP 2019-174890 A) discloses an automatic traveling system which causes a work vehicle that is working within a field to move to a preset evacuation region on the basis of an instruction by a worker.

CITATION LIST

Patent Literature

Patent Literature 1: JPH09-154315 A
Patent Literature 2: JP 2019-174890 A

DISCLOSURE OF INVENTION

In the technologies described in Patent Literatures 1 and 2, when the work vehicle is to move to the replenishment position or the evacuation region, a travelable region for the work vehicle is not set according to the type of work. However, the travelable region differs according to type of work being performed in the field. For example, in work for performing seeding, the work vehicle should not travel through an already-worked region. Also, in work for performing harvesting, the work vehicle should not travel through an unworked region.

In view of the above circumstances, one of the objectives of the present disclosure is to provide a route setting device which sets a travelable region according to the type of work. The other objectives can be understood from the following description and the description of embodiments.

A route setting method according to one embodiment for achieving the above objective includes receiving an instruction for a work vehicle moving in a field along a preset work route, and acquiring the position of the work vehicle. Also, the route setting method includes generating a departure route for the work vehicle to depart from a work region in which the work vehicle performs work in the field, on the basis of the instruction and a work machine used for the work in the field as the work vehicle moves within the field.

An autonomous traveling method according to one embodiment for achieving the above objective includes the route setting method described above and causing a work vehicle to move along a departure route or a work route automatically.

A route setting device according to one embodiment for achieving the above objective is provided with a situation ascertainment unit and a departure route setting unit. The situation ascertainment unit receives an instruction for a work vehicle moving in a field along a preset work route, and acquires the position of the work vehicle. The departure route setting unit generates, on the basis of the instruction and a work machine used for work in the field as the work vehicle moves within the field, a departure route for the work vehicle to depart from a work region in which the work vehicle performs the work in the field.

An autonomous traveling system according to one embodiment for achieving the above objective includes the route setting device described above and a work vehicle that moves along a departure route or a work route automatically.

A non-transitory tangible storage medium according to one embodiment for achieving the above objective stores a route setting program. The route setting program causes a computation device to execute receiving an instruction for a work vehicle moving in a field along a preset work route, and acquiring the position of the work vehicle. Also, the route setting program causes the computation device to execute generating a departure route for the work vehicle to depart from a work region in which the work vehicle performs work in the field, on the basis of the instruction and a work machine used for the work in the field as the work vehicle moves within the field.

According to the above embodiments, a travel vehicle can travel through a region corresponding to the type of work.

DESCRIPTION OF EMBODIMENTS

Embodiments

Figure 1:
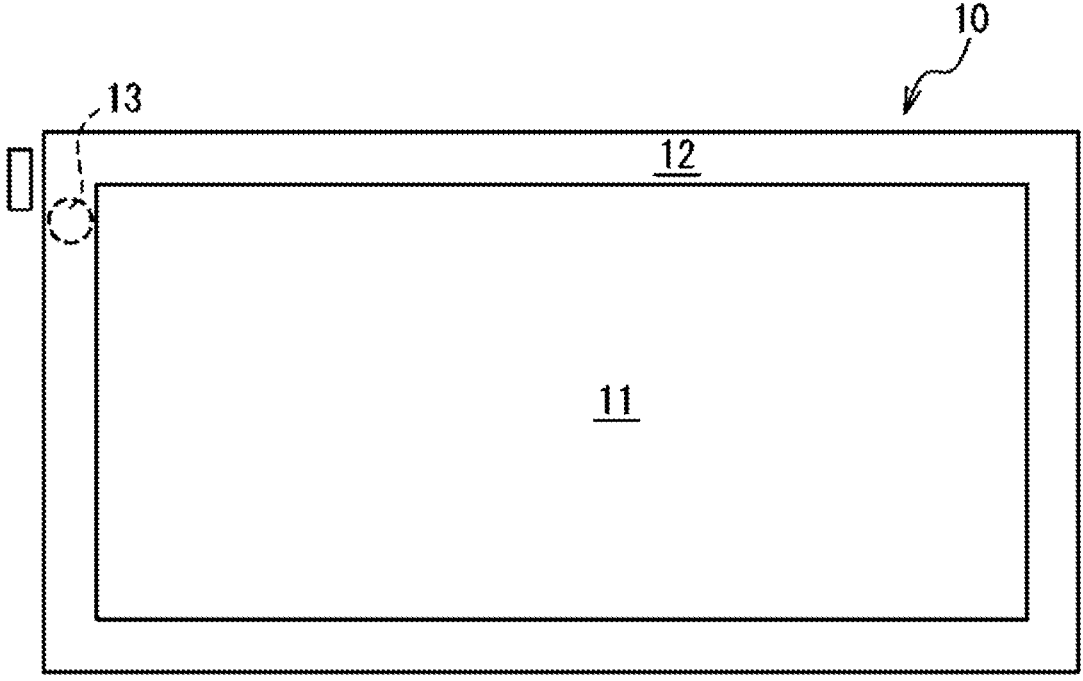
FIG. 1 is a schematic view of a field of one embodiment.

An autonomous traveling system 100 according to the present embodiment of the present invention will be described with reference to the drawings. In the present embodiment, a field 10 in which work, such as plowing, leveling, fertilizing, harvesting, and the like, is performed using a work vehicle 130 includes a central work region 11 and a headland 12, which surrounds the work region 11, as illustrated in FIG. 1. The work region 11 represents a region in which work is performed to cultivate crops. The headland 12 is provided to allow the work vehicle 130 to turn, for example. The work vehicle 130 includes a vehicle that tows a work machine, such as a tractor, and a vehicle formed integrally with a work machine, such as a combine harvester. The work vehicle 130 moves within the field 10, thereby performing work using the work machine in the field 10. When the work vehicle 130 is performing work in the field 10, the work vehicle 130 departs from the work region 11 and moves to a departure position 13 in order to have materials such as seedlings replenished. At this time, a traveling region in which the work vehicle 130 can travel varies according to the type of work. For example, when performing planting, the work vehicle 130 may not be allowed to enter an already-planted region. Also, when performing harvesting, the work vehicle 130 may not be allowed to enter an unharvested region. For this reason, the autonomous traveling system 100 according to the present embodiment generates a route to the departure position 13 according to the model of the work machine used for the work.

Configuration of Autonomous Traveling System

Figure 2:
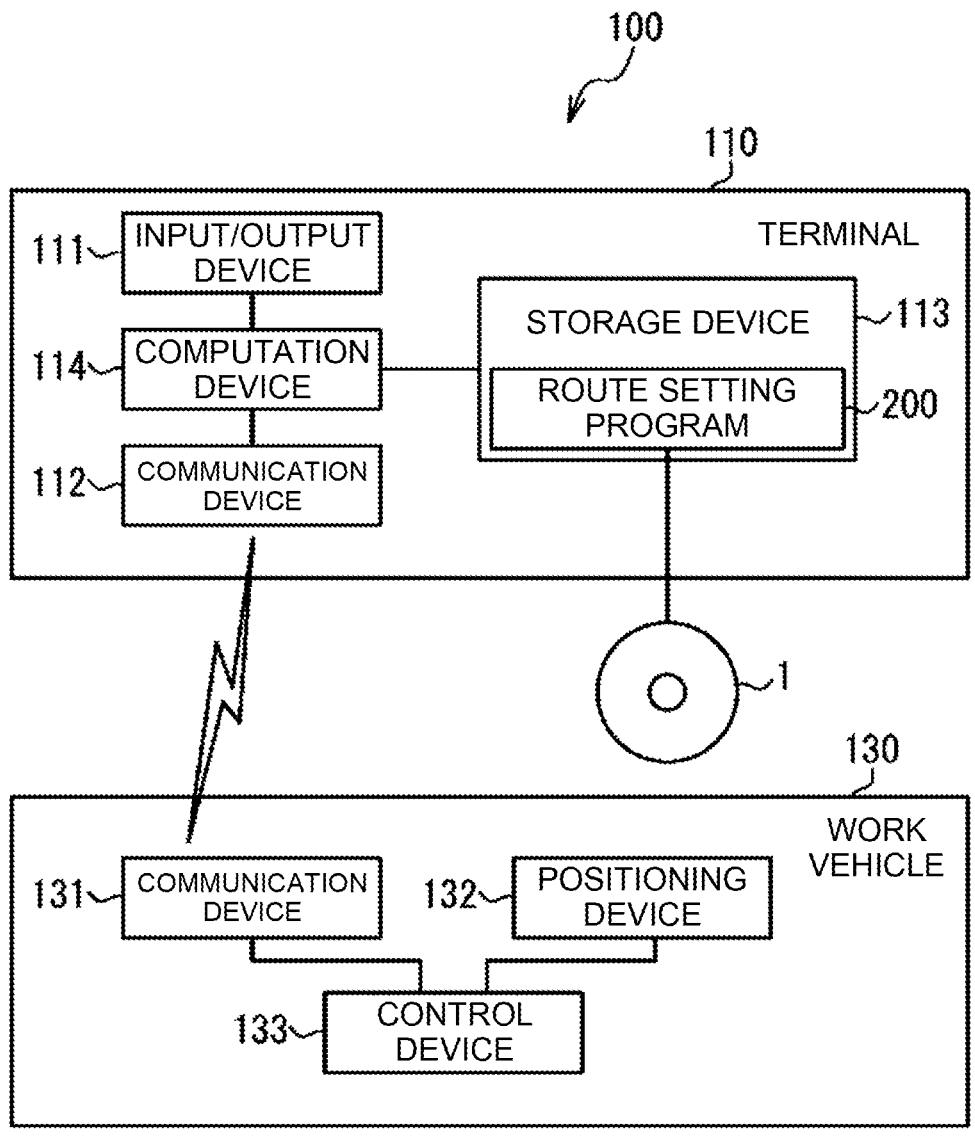
FIG. 2 is a configuration diagram of an autonomous traveling system of one embodiment.

The autonomous traveling system 100 is provided with a terminal 110 and the work vehicle 130, as illustrated in FIG. 2. The terminal 110 generates a route along which the work vehicle 130 moves within a field.

A configuration of the terminal 110 will be described. The terminal 110 is provided with an input/output device 111, a communication device 112, a storage device 113, and a computation device 114. Examples of the terminal 110 are a computer, a tablet, and a mobile phone. In the input/output device 111, information used by the computation device 114 to execute processing is input. In addition, the input/output device 111 outputs a result of the processing executed by the computation device 114. The input/output device 111 includes various kinds of input devices and output devices, and examples of the input/output device 111 are a keyboard, a mouse, a microphone, a display, a speaker, and a touch panel.

The communication device 112 communicates with a communication device 131 of the work vehicle 130. The communication device 112 transfers each piece of information acquired from the work vehicle 130 to the computation device 114. Signals generated by the computation device 114 are also transferred to the communication device 131 of the work vehicle 130. The communication device 112 includes, for example, a transceiver for a wireless local area network (LAN) and various interfaces such as a network interface card (NIC) and a universal serial bus (USB).

The storage device 113 stores various kinds of data for setting a route of the work vehicle 130, e.g., a route setting program 200. The storage device 113 is used as a non-transitory tangible storage medium to store the route setting program 200. The route setting program 200 may be provided as a computer program product recorded on a computer-readable storage medium 1, or may be provided as a computer program product that can be downloaded from a server.

Figure 3:
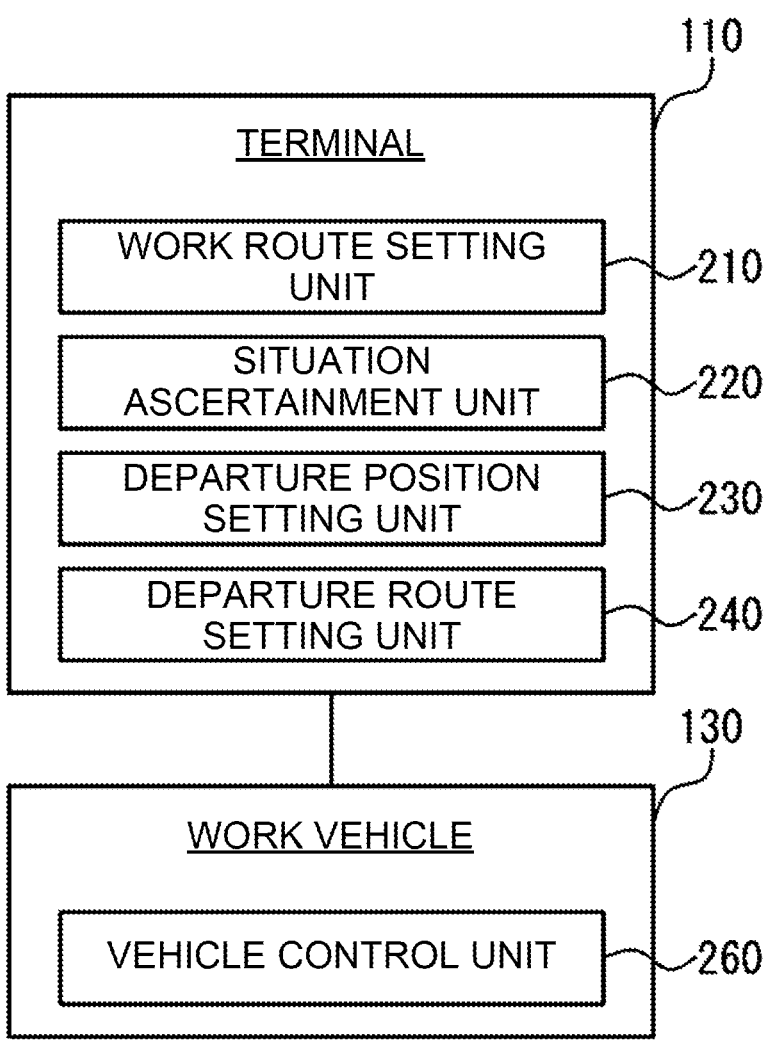
FIG. 3 is a functional block diagram of an autonomous traveling system of one embodiment.

The computation device 114 reads the route setting program 200 from the storage device 113 and executes the route setting program 200, thereby performing various kinds of data processing for setting a route of the work vehicle 130. The computation device 114 executes the route setting program 200, thereby realizing a work route setting unit 210, a situation ascertainment unit 220, a departure position setting unit 230, and a departure route setting unit 240, as illustrated in FIG. 3. For example, the computation device 114 includes a central processing unit (CPU) and the like.

The work route setting unit 210 generates a work route along which the work vehicle 130 moves when work is performed in the field 10. The situation ascertainment unit 220 acquires the positions of the work vehicle 130 in the field 10 at respective times and ascertains the situation of the work within the field. The departure position setting unit 230 sets the departure position 13 where the work vehicle 130, which has departed from the work region 11 toward the headland 12, is to stop in replenishment of materials and the like. The departure route setting unit 240 generates a departure route to be taken when the work vehicle 130 moves to the departure position 13.

Next, a configuration of the work vehicle 130 will be described. As illustrated in FIG. 2, the work vehicle 130 is provided with the communication device 131, a positioning device 132, and a control device 133. The communication device 131 communicates with the communication device 112 of the terminal 110. The communication device 131 transfers each piece of information acquired from the computation device 114 of the terminal 110 to the control device 133. Signals generated by the control device 133 are also transferred to the communication device 112 of the terminal 110. The communication device 131 includes, for example, a transceiver for a wireless local area network (LAN) and various interfaces such as a network interface card (NIC) and a universal serial bus (USB).

The positioning device 132 measures the position of the work vehicle 130. The positioning device 132 is a receiver of, for example, a global navigation satellite system (GNSS), and measures the positions of the work vehicle 130 at respective times by receiving signals from an artificial satellite or a terrestrial base station. Positional information indicating the time when and the position at which the measurement has been made is transmitted to the control device 133.

The control device 133 controls each unit of the work vehicle 130 and realizes a vehicle control unit 260 illustrated in FIG. 3. The vehicle control unit 260 acquires the positional information of the work vehicle 130 from the positioning device 132, and performs an operation of the work vehicle 130, such as acceleration, steering, and braking, thereby causing the work vehicle 130 to move along a route acquired from the terminal 110. Also, the vehicle control unit 260 controls an operation of a work machine and performs work within the field 10. For example, the control device 133 includes a computation device such as a central processing unit (CPU).

Action of Autonomous Traveling System

Figure 4:
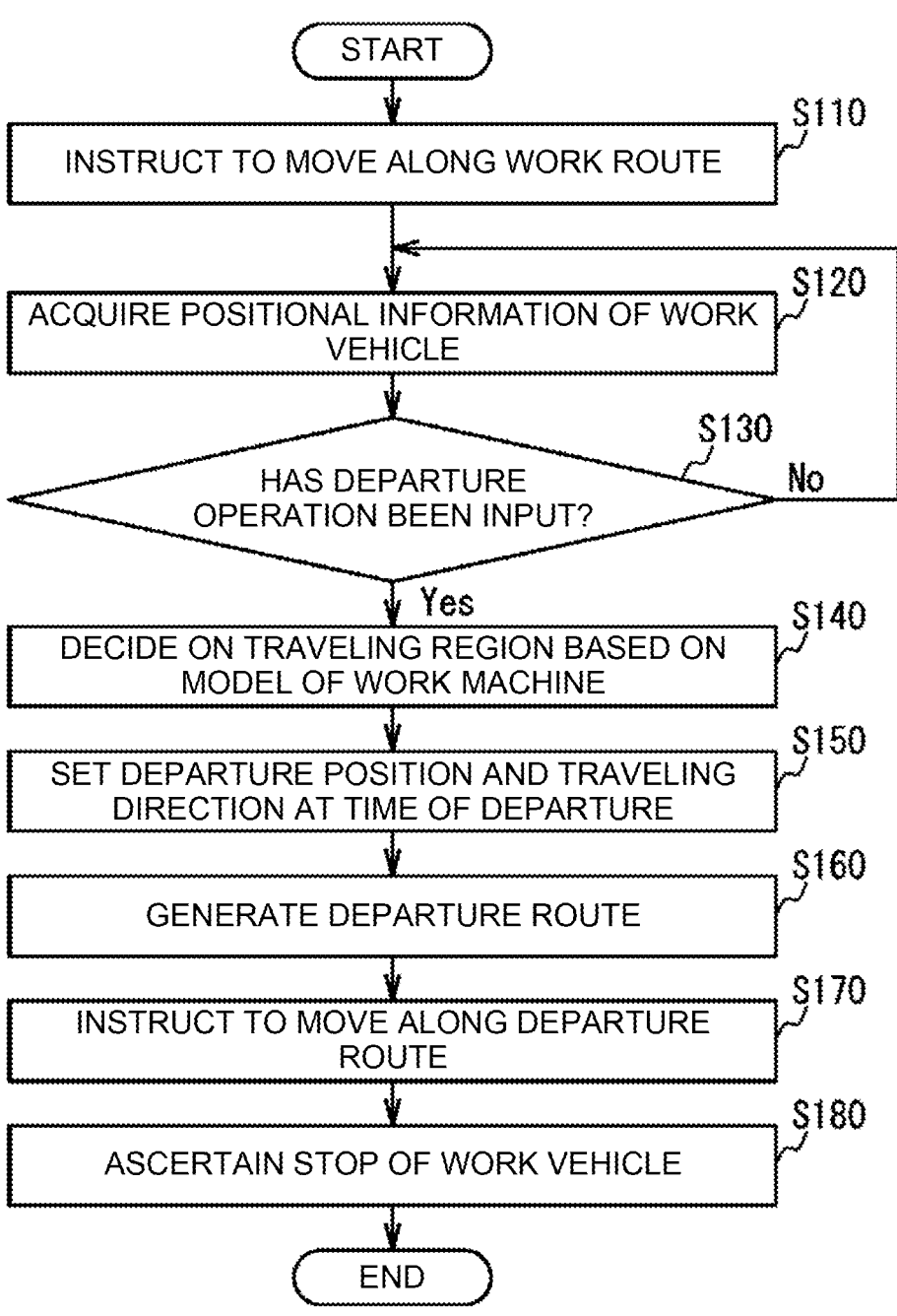
FIG. 4 is a flowchart illustrating processing executed by a route setting program of one embodiment.

When the work vehicle 130 moves to a position at which work in the field 10 is to be started, and a user, i.e., the owner or a producer of the field 10, for example, inputs to the terminal 110 an operation for starting the work, the terminal 110 executes processing illustrated in FIG. 4 corresponding to a route setting method. In step S110, the work route setting unit 210 which is realized by the computation device 114 of the terminal 110 generates, in the vehicle control unit 260 of the work vehicle 130, a work start signal indicating a work route and a start of the work. When the vehicle control unit 260 receives the work start signal, the vehicle control unit 260 controls the work vehicle 130 such that the work vehicle 130 moves automatically along the work route indicated by the work start signal. Also, the vehicle control unit 260 controls the operation of the work machine on the basis of the work start signal. Note that the work route is set before starting the work and is stored in the storage device 113 of the terminal 110.

In step S120, the situation ascertainment unit 220 acquires positional information from the vehicle control unit 260 of the work vehicle 130, and decides on an already-worked region and an unworked region on the basis of the acquired positional information. Specifically, the vehicle control unit 260 transmits the positional information measured by the positioning device 132 to the situation ascertainment unit 220. The situation ascertainment unit 220 acquires the positions of the work vehicle 130 at respective times from the acquired positional information, and decides on a region in which the work has been finished on the basis of the acquired positions of the work vehicle 130. For example, the situation ascertainment unit 220 decides that the periphery of the acquired positions of the work vehicle 130, i.e., a range included in a predetermined distance from the acquired positions, for example, is to be applied as the already-worked region in which the work has been finished. Therefore, the situation ascertainment unit 220 decides that a region, which is from a start position to the position of the work vehicle 130 in the work route, is to be applied as a region in which the work has been finished. Also, the situation ascertainment unit 220 decides that a region, which is from the position of the work vehicle 130 to an end position in the work route, is to be applied as a region in which the work is yet to be finished.

In step S130, the situation ascertainment unit 220 determines whether a departure operation for causing the work vehicle 130 to be departed to the departure position 13 has been input to the input/output device 111 of the terminal 110. For example, the situation ascertainment unit 220 displays a departure button on the input/output device 111 of the terminal 110 to receive the departure operation made by the user. When the user selects the departure button on the input/output device 111 of the terminal 110, the situation ascertainment unit 220 determines that the departure operation has been input. If the situation ascertainment unit 220 determines that no departure operation has been input, processing is returned to the processing of step S120 to repeat this processing. If the situation ascertainment unit 220 determines that the departure operation has been input, the processing proceeds to step S140.

In step S140, the departure route setting unit 240 decides on a traveling region 300 in which the work vehicle 130 is to travel on the basis of the work machine. Specifically, the departure route setting unit 240 selects one region segment from among multiple region segments, e.g., three region segments, on the basis of the work machine, more specifically, the type or model of the work machine, for example.

The region segment represents a travelable region decided according to the work, and is associated with the type or model of the work machine used for the work. The departure route setting unit 240 decides on the traveling region 300 on the basis of the selected region segment. The type or model of the work machine may be input by the user from the input/output device 111 of the terminal 110 in advance or obtained from the vehicle control unit 260 of the work vehicle 130.

Figure 5A:
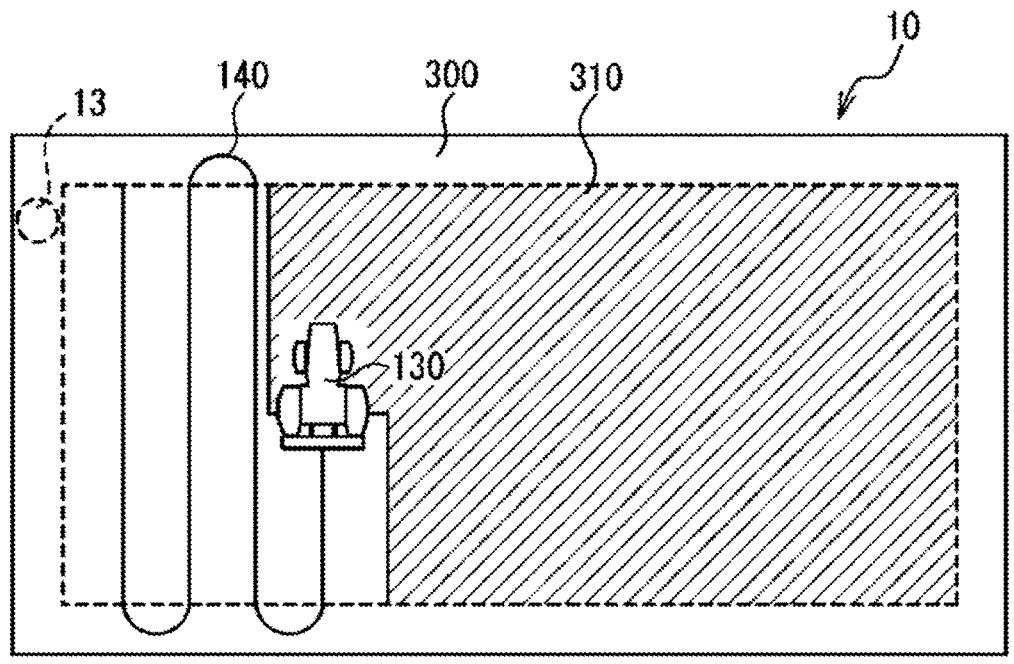
FIG. 5A is a diagram for illustrating a region segment of one embodiment.

For example, it is assumed that a work machine for work, such as cultivation work or harvesting work in which the work vehicle 130 should not travel through a region where work has not been performed, is being used. In this case, the departure route setting unit 240 sets, on the basis of the type or model of the work machine being used, the unworked region to be prohibited from being traveled, and selects a region segment in which the already-worked region and the headland 12 are set as a travelable region. Thus, on the basis of the selected region segment, the departure route setting unit 240 sets the unworked region as a traveling prohibited region 310 where traveling of the work vehicle 130 is prohibited, as illustrated in FIG. 5A. Further, the already-worked region, i.e., a region surrounding a track 140 on which the work vehicle 130 has moved, for example, and the headland 12 are set as the traveling region 300 in which the work vehicle 130 can travel.

Figure 5B:
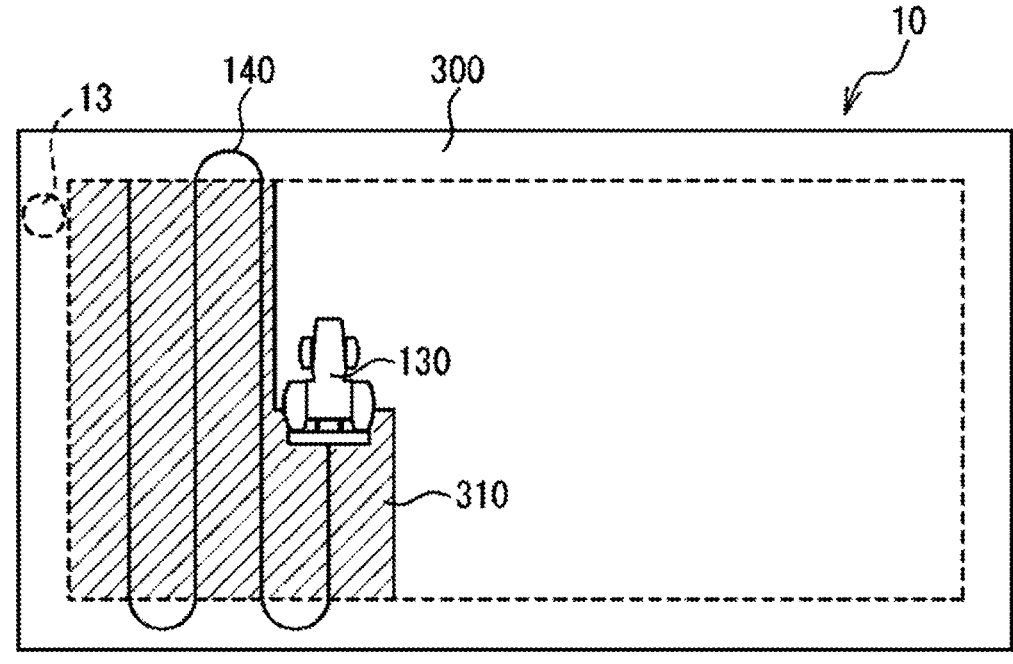
FIG. 5B is a diagram for illustrating a region segment of one embodiment.

Further, it is assumed that a work machine for work, such as planting, in which the work vehicle 130 should not travel through the already-worked region is being used. In this case, the departure route setting unit 240 sets, on the basis of the type or model of the work machine being used, the already-worked region to be prohibited from being traveled, and selects a region segment in which the unworked region and the headland 12 are set as a travelable region. Thus, on the basis of the selected region segment, the departure route setting unit 240 sets the already-worked region as the traveling prohibited region 310 where traveling of the work vehicle 130 is prohibited, as illustrated in FIG. 5B. Furthermore, the unworked region and the headland 12 are set as the traveling region 300 in which the work vehicle 130 can travel.

Moreover, it is assumed that a work machine for work, such as pesticide spraying, in which the work vehicle 130 can travel through both the already-worked region and the unworked region is being used. In this case, the departure route setting unit 240 selects, on the basis of the type or model of the work machine being used, a region segment in which the whole of the field 10 is set as a travelable region. Thus, on the basis of the selected region segment, the departure route setting unit 240 sets the entire field 10 as the traveling region 300 in which the work vehicle 130 can travel. In this case, the departure route setting unit 240 may generate a shortest route from the position of the work vehicle 130 to the departure position 13 as the departure route.

Figure 6:
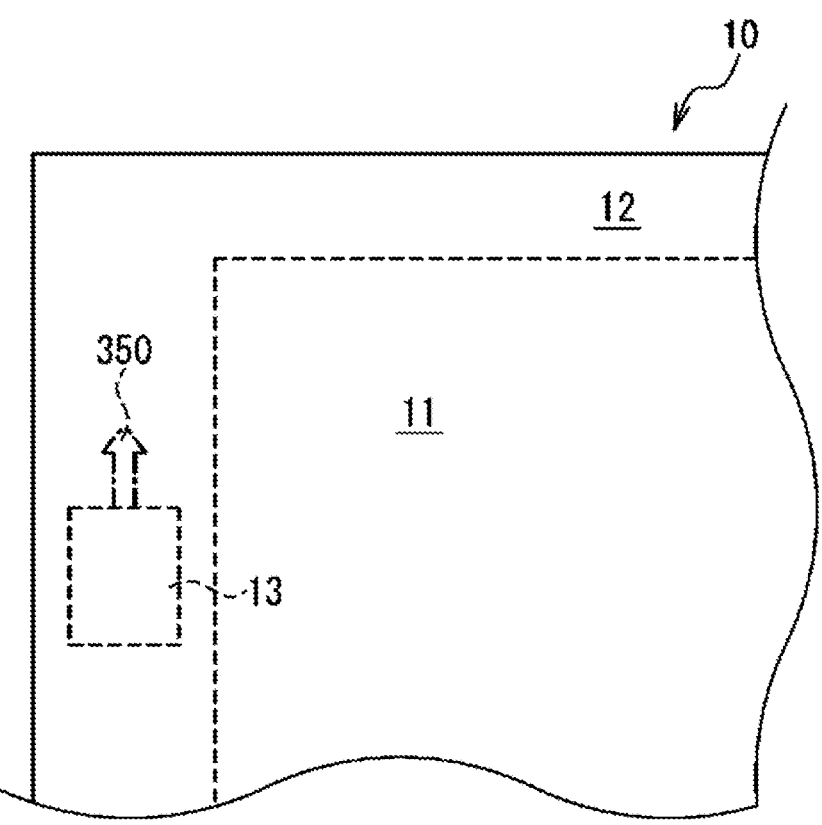
FIG. 6 is a diagram for illustrating a departure position and a departure direction of one embodiment.

In step S150, the departure position setting unit 230 selects the departure position 13 and a departure direction 350, which represents a traveling direction taken at the time of stopping at the departure position 13, in response to the user input. For example, the user selects the departure position 13 on a map of the field 10 displayed on the input/output device 111 of the terminal 110, as illustrated in FIG. 6. The departure position setting unit 230 sets the selected departure position 13 as the position for departure. Further, the user selects the departure direction 350 representing the traveling direction taken at the time when the work vehicle 130 stops at the departure position 13. The departure position setting unit 230 sets the selected departure direction 350 as the traveling direction taken at the time when the work vehicle 130 reaches the departure position 13.

In step S160, the departure route setting unit 240 generates a departure route from the work vehicle 130 of the current location to the departure position 13. The departure route is generated such that the entire route is included in the traveling region 300. A method of generating the departure route will be described later.

In step S170, the departure route setting unit 240 generates, in the vehicle control unit 260 of the work vehicle 130, a departure start signal indicating the departure route. When the vehicle control unit 260 receives the departure start signal, the vehicle control unit 260 controls the work vehicle 130 such that the work vehicle 130 moves automatically along the departure route indicated by the departure start signal.

Further, the situation ascertainment unit 220 acquires the positional information from the vehicle control unit 260 of the work vehicle 130. Specifically, the vehicle control unit 260 transmits the positional information measured by the positioning device 132 to the situation ascertainment unit 220. The situation ascertainment unit 220 acquires the positions of the work vehicle 130 at respective times from the acquired positional information.

In step S180, the situation ascertainment unit 220 ascertains that the work vehicle 130 has reached the departure position 13 and has stopped. When the situation ascertainment unit 220 ascertains that the work vehicle 130 has stopped, the processing is ended.

In this way, when the work vehicle 130 departs toward the headland 12, the computation device 114 generates the departure route according to the type or model of the work machine. The vehicle control unit 260 causes the work vehicle 130 to move along the generated departure route. In this way, according to an autonomous traveling method, the work vehicle 130 can depart from the work region.

Method of Generating Departure Route

Next, a method of generating a departure route will be described. The computation device 114 of the terminal 110 executes the processing illustrated in FIGS. 7A and 7B, and generates the departure route. The departure route setting unit 240 realized by the computation device 114 of the terminal 110 generates, in step S205, a first route 400 on the basis of the position of the work vehicle 130. Specifically, the departure route setting unit 240 generates, on the basis of the region segment selected in step S140 of FIG. 4 and the position of the work vehicle 130, the first route 400 parallel to the traveling direction of the work vehicle 130 with the current position of the work vehicle 130 being a starting point.

Figure 8A:
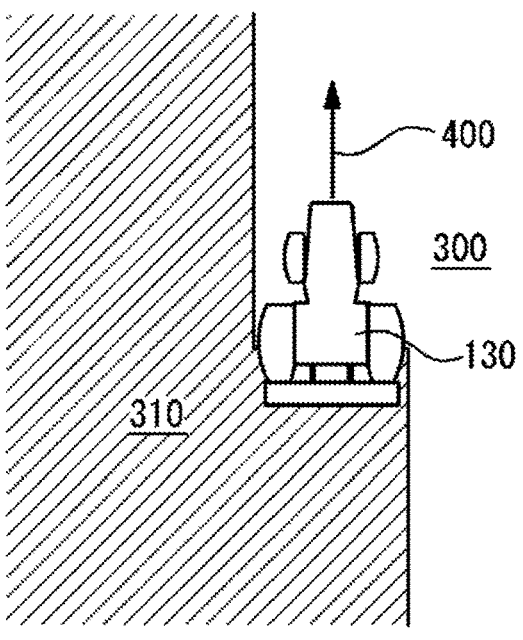
FIG. 8A is a diagram for illustrating processing of generating a first route of one embodiment.
Figure 8B:
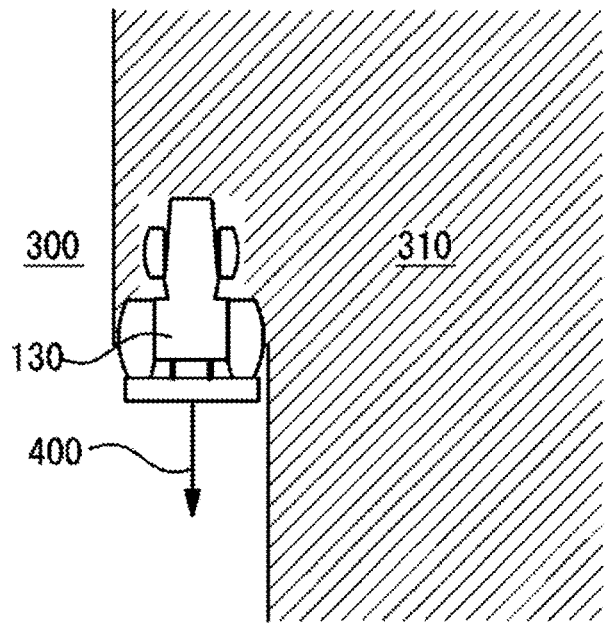
FIG. 8B is a diagram for illustrating processing of generating a first route of one embodiment.

For example, when a region segment in which the unworked region is set to be travelable is selected, the departure route setting unit 240 sets, as illustrated in FIG. 8A, a line segment extending a predetermined distance, e.g., one meter, in the traveling direction, with the current position of the work vehicle 130 being a starting point, as the first route 400. In this case, the first route 400 indicates that the work vehicle 130 is to move forward along the first route 400. Further, when a region segment in which the unworked region is set to be prohibited from being traveled is selected, the departure route setting unit 240 sets, as illustrated in FIG. 8B, a line segment extending a predetermined distance, e.g., one meter, backward, which is the opposite direction of the traveling direction, with the current position of the work vehicle 130 being a starting point, as the first route 400. In this case, the first route 400 indicates that the work vehicle 130 is to move backward along the first route 400.

Figure 7A:
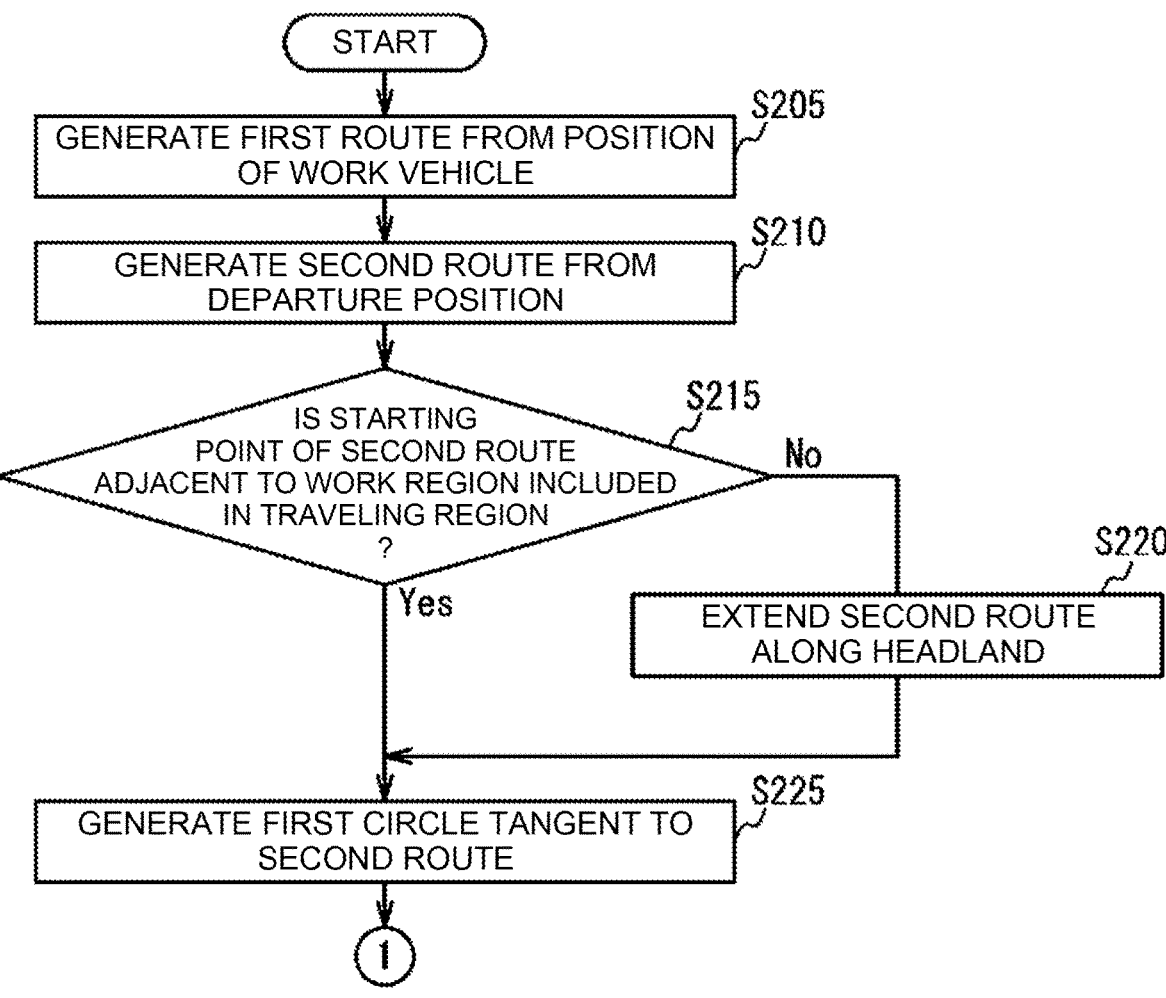
FIG. 7A is a flowchart illustrating processing of generating a departure route of one embodiment.
Figure 9:
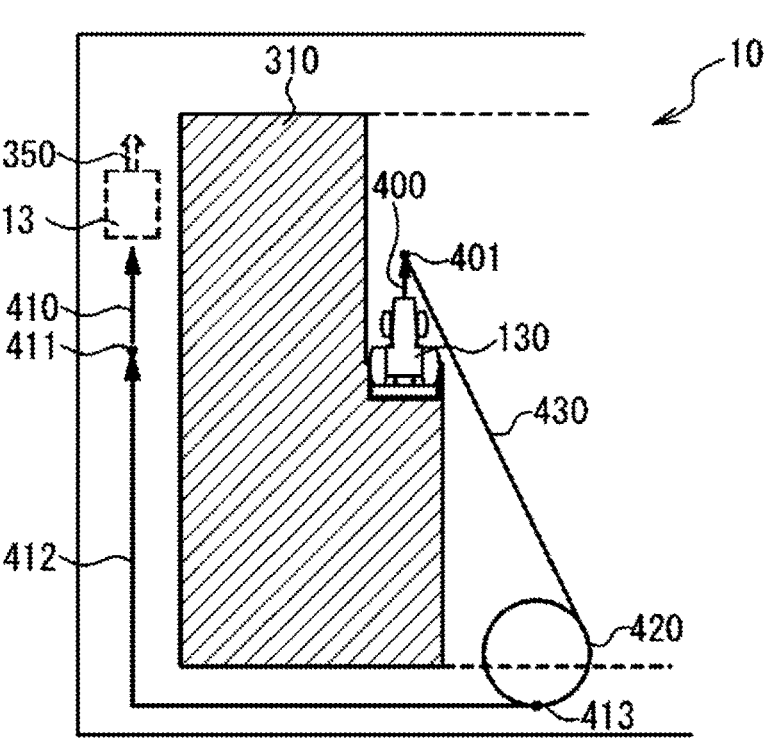
FIG. 9 is a diagram for illustrating processing of generating a departure route of one embodiment.

In step S210 illustrated in FIG. 7A, the departure route setting unit 240 generates a second route 410 on the basis of the departure position 13. Specifically, the departure route setting unit 240 sets, as illustrated in FIG. 9, a line segment extending a predetermined distance, e.g., one meter, in the opposite direction of the departure direction 350, with the departure position 13 being an end point, as the second route 410. The second route 410 indicates that the work vehicle 130 is to proceed in the departure direction 350 along the set line segment.

In step S215 illustrated in FIG. 7A, the departure route setting unit 240 determines whether a second starting point 411 of the second route 410 is adjacent to the work region 11 included in the traveling region 300. Specifically, the departure route setting unit 240 determines whether the work vehicle 130 can move directly from the work region 11 to the second starting point 411 of the second route 410. For example, as illustrated in FIG. 9, when the work region 11 adjacent to the second starting point 411 of the second route 410 corresponds to the traveling prohibited region 310, the departure route setting unit 240 determines that the work vehicle 130 cannot move directly from the work region 11 to the second starting point 411 of the second route 410, and executes the processing of step S220. When the work region 11 adjacent to the second starting point 411 of the second route 410 corresponds to the traveling region 300, the departure route setting unit 240 determines that the work vehicle 130 can move directly from the work region 11 to the second starting point 411 of the second route 410, and executes the processing of step S225.

In step S220, the departure route setting unit 240 extends the second route 410 from the second starting point 411 of the second route 410 along the headland 12 until the route is adjacent to the work region 11 included in the traveling region 300. For example, the departure route setting unit 240 generates an extended route 412 along the headland 12 from the starting point of the second route 410, as illustrated in FIG. 9. The extended route 412 is extended from an end point of the extended route 412 to a position at which an extension starting point 413 of the extended route 412 is adjacent to the work region 11 included in the traveling region 300. Therefore, the extension starting point 413 of the extended route 412 is set at a position where the work vehicle 130 can move directly from the work region 11. The departure route setting unit 240 performs the subsequent processing assuming that a route obtained by adding the extended route 412 to the second route 410 is the second route 410.

In step S225, the departure route setting unit 240 generates a first circle 420 tangent to the second route 410, thereby generating a route through which the work vehicle 130 enters the second route 410. As illustrated in FIG. 9, the departure route setting unit 240 generates the first circle 420 tangent to the second route 410, or more specifically, the extended route 412 in this case, with the starting point of the second route 410, or more specifically, the extension starting point 413 of the extended route 412 obtained by extending the second route 410 in this case, being the point of tangency. More particularly, the first circle 420 is generated so as to be tangent to a straight line extending in the traveling direction of the work vehicle 130 at the extension starting point 413 of the extended route 412. In the example of FIG. 9, the work vehicle 130 moves clockwise along the circumference of the first circle 420 such that the traveling direction is changed to the right along the circumference of the first circle 420. By doing so, the work vehicle 130 moves along the extended route 412. Here, the first circle 420 has a minimum turning radius indicating the minimum radius at which the work vehicle 130 can turn.

Figure 7B:
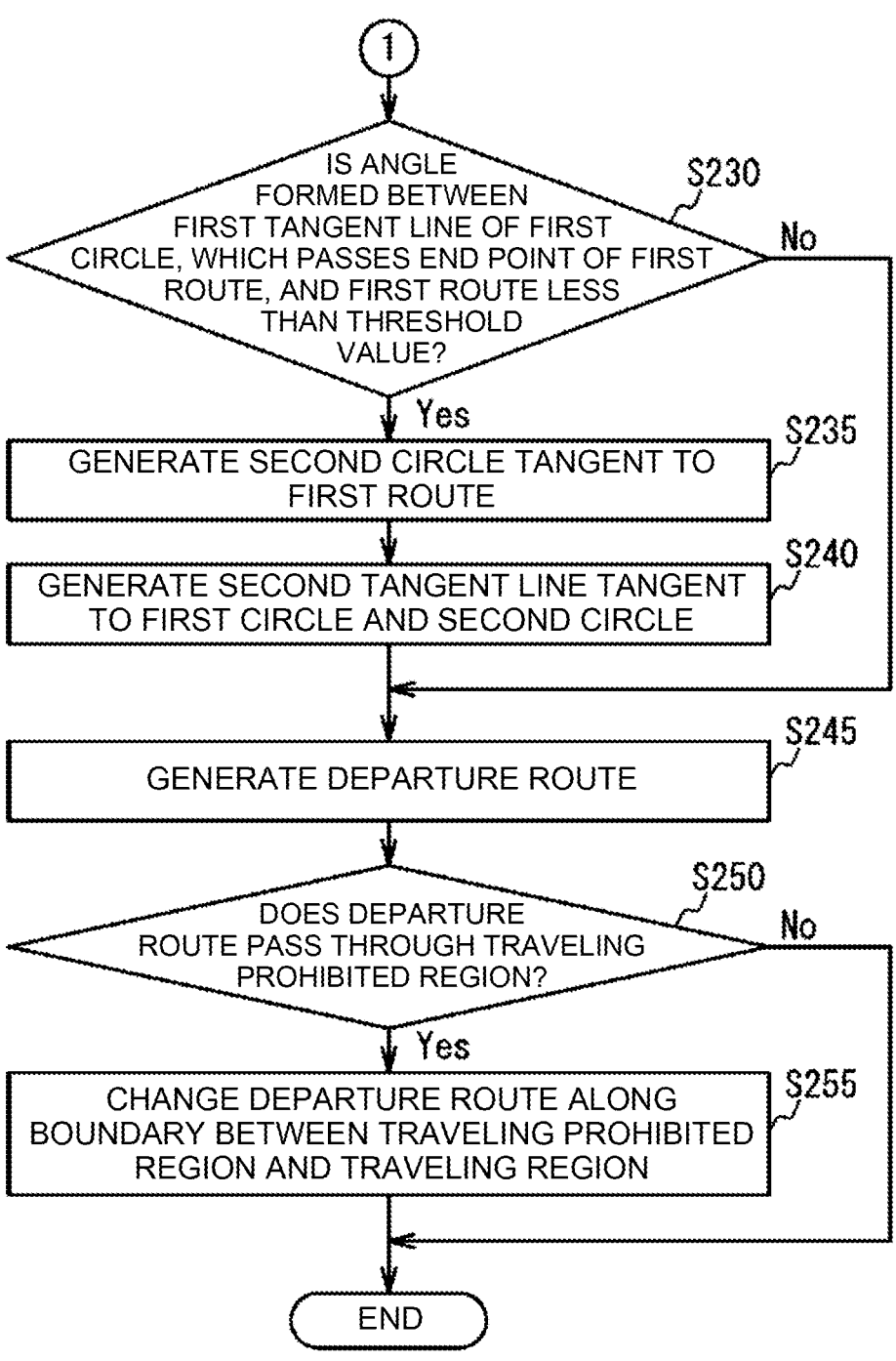
FIG. 7B is a flowchart illustrating processing of generating a departure route of one embodiment.
Figure 10:
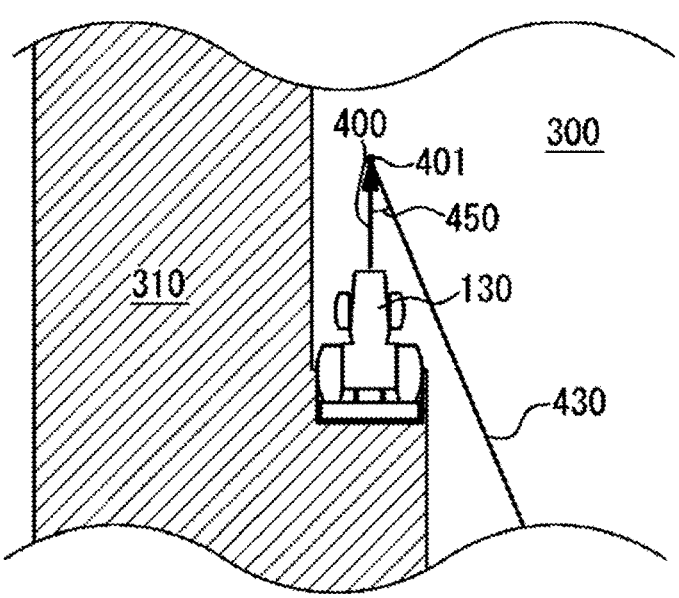
FIG. 10 is a diagram for illustrating processing of generating a departure route of one embodiment.

In step S230 illustrated in FIG. 7B, the departure route setting unit 240 determines whether an angle formed between a first tangent line 430, which passes a first end point 401 of the first route 400 and is tangent to the first circle 420, and the first route 400 is less than a threshold value. Specifically, the departure route setting unit 240 generates the first tangent line 430 that passes the first end point 401 of the first route 400 and is tangent to the first circle 420, as illustrated in FIG. 9. Next, as illustrated in FIG. 10, a first angle 450 formed between the first route 400 and the first tangent line 430 is calculated. The departure route setting unit 240 compares the calculated first angle 450 with the threshold value, and executes the processing of step S235 when the first angle 450 is smaller than the threshold value. The departure route setting unit 240 executes the processing of step S240 when the first angle 450 is greater than or equal to the threshold value. The threshold value is determined on the basis of an angle at which the turning radius can be ignored when the work vehicle 130 is to change the traveling direction. For example, when the turning radius of the work vehicle 130 can be ignored if the angle for changing the traveling direction of the work vehicle 130 is 45 degrees or less, the threshold value is 135 degrees.

Figure 11:
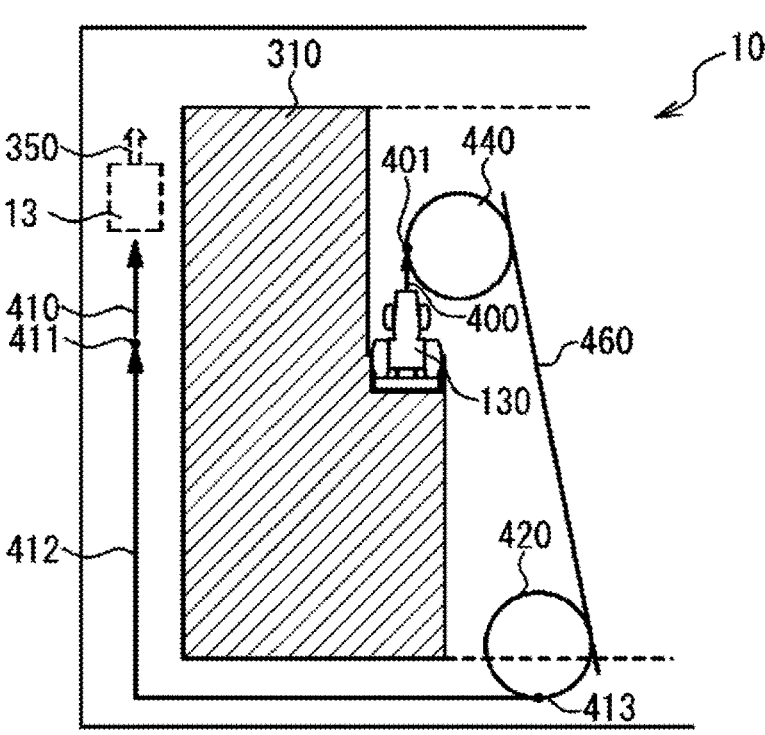
FIG. 11 is a diagram for illustrating processing of generating a departure route of one embodiment.

In step S235, the departure route setting unit 240 generates a second circle 440 with the first end point 401 of the first route 400 being the point of tangency such that the work vehicle 130 makes a turn toward the first circle 420. As illustrated in FIG. 11, the departure route setting unit 240 generates the second circle 440 tangent to the first route 400, with the first end point 401 of the first route 400 being the point of tangency. More particularly, the second circle 440 is generated so as to be tangent to a straight line including the first route 400. In the example of FIG. 9, the work vehicle 130 moves clockwise along the circumference of the second circle 440 such that the traveling direction is changed to the right along the circumference of the second circle 440. By doing so, the traveling direction of the work vehicle 130 is oriented toward the first circle 420. Here, the second circle 440 has a minimum turning radius indicating the minimum radius at which the work vehicle 130 can turn.

In step S240, the departure route setting unit 240 generates a second tangent line 460 which is tangent to the first circle 420 and the second circle 440. As illustrated in FIG. 11, the second tangent line 460 indicates a route along which the work vehicle 130 moves from the second circle 440 to the first circle 420. The circumference of the second circle 440 represents a route along which the work vehicle 130 moves clockwise. Therefore, the departure route setting unit 240 generates the second tangent line 460 such that the second circle 440 is located to the right of the work vehicle 130 when the work vehicle 130 moves along the second tangent line 460. The circumference of the first circle 420 also represents a route along which the work vehicle 130 moves clockwise. Therefore, the departure route setting unit 240 generates the second tangent line 460 such that the first circle 420 is located to the right of the work vehicle 130 when the work vehicle 130 moves along the second tangent line 460. As can be seen, the second tangent line 460 is generated according to the direction in which the work vehicle 130 turns as the work vehicle 130 moves over the circumference of the first circle 420 and the circumference of the second circle 440.

Figure 12:
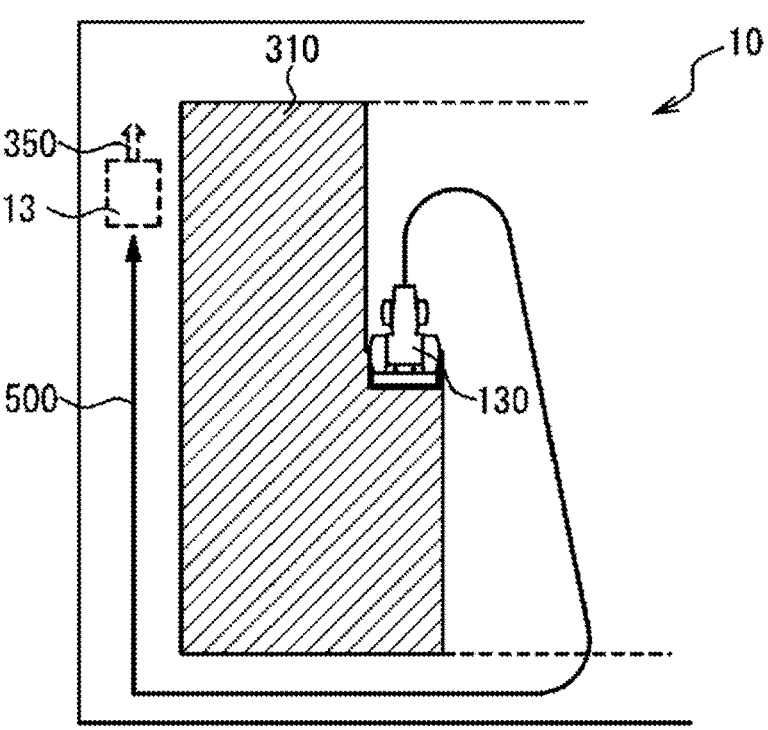
FIG. 12 is a diagram for illustrating processing of generating a departure route of one embodiment.

In step S245, the departure route setting unit 240 generates a departure route 500 which connects each of the circles and the line segments that have been generated. In the example illustrated in FIG. 12, the departure route setting unit 240 sets a route connecting the first route 400, the circumference of the second circle 440, the second tangent line 460, the circumference of the first circle 420, the extended route 412, and the second route 410, as the departure route 500. Specifically, of the circumference of the second circle 440 illustrated in FIG. 11, an arc formed by connecting the point of tangency with the first route 400 (i.e., the first end point 401), which is assumed as the starting point, and the point of tangency with the second tangent line 460, which is assumed as the end point, in a clockwise manner is set as a part of the departure route 500 illustrated in FIG. 12. In the second tangent line 460 illustrated in FIG. 11, a line segment in which the point of tangency with the second circle 440 corresponds to the starting point and the point of tangency with the first circle 420 corresponds to the end point is set as a part of the departure route 500. Of the circumference of the first circle 420, an arc formed by connecting the point of tangency with the second tangent line 460, which is assumed as the starting point, and the point of tangency with the extended route 412 (i.e., the extension starting point 413), which is assumed as the end point, in a clockwise manner is set as a part of the departure route 500. As described above, the departure route setting unit 240 generates the route connecting the first route 400, the arc of the second circle 440 that is set as the route, the line segment of the second tangent line 460 that is set as the route, the arc of the first circle 420 that is set as the route, the extended route 412, and the second route 410 as the departure route 500 illustrated in FIG. 12.

If it is determined as "NO" in step S230, or more specifically, if the first angle 450 formed between the first tangent line 430 and the first route 400 is greater than or equal to the threshold value, the departure route setting unit 240 does not generate the second circle 440. Thus, the departure route setting unit 240 generates a route connecting, for example, the first route 400, the first tangent line 430, the circumference of the first circle 420, the extended route 412, and the second route 410, which have been generated, as the departure route 500.

Further, if it is determined as "YES" in step S215, or more specifically, if the work vehicle 130 can move directly from the work region 11 to the second starting point 411 of the second route 410, the departure route setting unit 240 does not generate the extended route 412. Thus, the departure route setting unit 240 generates a route connecting, for example, the first route 400, the circumference of the second circle 440, the second tangent line 460, the circumference of the first circle 420, and the second route 410, which have been generated, as the departure route 500.

In step S250, the departure route setting unit 240 determines whether the generated departure route 500 passes through the traveling prohibited region 310. When the departure route 500 passes through the traveling prohibited region 310, the departure route setting unit 240 executes step S255 in order to change the departure route 500. When the departure route 500 does not pass through the traveling prohibited region 310, the departure route setting unit 240 decides that the generated departure route 500 is to be applied as the route for the work vehicle 130 to depart to the departure position 13, and ends the generation of the departure route 500.

In step S255, the departure route setting unit 240 changes the route, which is included in the traveling prohibited region 310, of the generated departure route 500 to a route along a boundary between the traveling prohibited region 310 and the traveling region 300. Specifically, when the work vehicle 130 is to move along the generated departure route 500, the departure route setting unit 240 extracts a position where the work vehicle 130 enters the traveling prohibited region 310 as the starting point, and extracts a position where the work vehicle 130 enters the traveling region 300 from the traveling prohibited region 310 as the end point. The departure route setting unit 240 generates a detour route so that the route is detoured from the extracted starting point to the extracted end point by connecting those points along the boundary between the traveling prohibited region 310 and the traveling region 300. The departure route setting unit 240 changes the route, which is included in the traveling prohibited region 310, of the departure route 500 to the generated detour route. Consequently, the departure route 500 which does not pass through the traveling prohibited region 310 is generated. The departure route setting unit 240 decides that the newly generated departure route 500 is to be applied as the route for the work vehicle 130 to depart to the departure position 13, and ends the generation of the departure route 500.

As described above, when the work vehicle 130 departs from the work region 11, the autonomous traveling system 100 generates a route to the departure position 13 according to the type or model of the work machine, and can cause the work vehicle 130 to move along the generated route. Also, as the departure direction 350 is set, the autonomous traveling system 100 can stop the work vehicle 130 at the departure position 13 in such a way that the work vehicle 130 is oriented in a direction specified by the user, i.e., a direction in which it is easy for the user to get in and out of the work vehicle 130, for example.

Modified Examples

The configurations described in the embodiment are merely an example and can be modified to an extent that does not interfere with the function to be aimed. The present embodiment discloses an example in which the situation ascertainment unit 220 causes the work vehicle 130 to depart from the work region 11 on the basis of an input of the departure operation. However, the present embodiment is not limited to this example. The situation ascertainment unit 220 may cause the work vehicle 130 to depart from the work region 11 on the basis of a predetermined instruction. For example, the situation ascertainment unit 220 may cause the work vehicle 130 to depart on the basis of a replenishment instruction indicating that materials mounted on the work vehicle 130, such as seedlings, fertilizers, and pesticides, are to be replenished. In this case, the situation ascertainment unit 220 acquires the amount of materials being mounted from the work vehicle 130. When the acquired amount of materials is less than a threshold value, the situation ascertainment unit 220 determines that the replenishment instruction for replenishment of the materials has been input. Also, as the user inputs an operation for replenishment of the materials, the situation ascertainment unit 220 may determine that the replenishment instruction has been input.

Further, the situation ascertainment unit 220 may cause the work vehicle 130 to depart from the work region 11 on the basis of a discharge instruction indicating that the harvested crops are to be discharged. For example, the situation ascertainment unit 220 acquires the amount of crops being accumulated from the work vehicle 130. When the acquired amount of crops is greater than a threshold value, the situation ascertainment unit 220 determines that the discharge instruction for discharge of the crops has been input. Also, as the user inputs an operation for replenishment of the materials, the situation ascertainment unit 220 may determine that the discharge instruction has been input.

The present embodiment discloses an example in which the situation ascertainment unit 220 determines an already-worked region when the work vehicle 130 is moving along the work route. However, the present embodiment is not limited to this example. It is sufficient if the situation ascertainment unit 220 can distinguish between the already-worked region and the unworked region when a departure operation is input. For example, the situation ascertainment unit 220 may distinguish between the already-worked region and the unworked region on the basis of the position of the work vehicle 130 when the departure operation is input. For example, the situation ascertainment unit 220 decides that a region, which is from a start position to the position of the work vehicle 130 in the work route, is to be applied as the already-worked region. Also, the situation ascertainment unit 220 decides that a region, which is from the position of the work vehicle 130 to an end position in the work route, is to be applied as the unworked region.

The present embodiment discloses an example in which the departure route setting unit 240 selects one region segment from among three region segments, on the basis of the type or model of the work machine. However, the present embodiment is not limited to this example. The departure route setting unit 240 may select one region segment from among at least two region segments. For example, the region segment may be set in advance by the user. The user may set a region segment in which a predetermined region within the field 10 is assumed as the traveling prohibited region 310, and such a region segment may be associated with the type or model of the work machine. The set region segment is stored in the storage device 113.

The positioning device 132 may be selected arbitrarily on condition that the positioning device 132 can measure the position of the work vehicle 130. For example, the positioning device 132 may measure the position of the work vehicle 130 by acquiring the speed, the traveling direction, and the like, of the work vehicle 130 and calculating a moving route of the work vehicle 130.

The embodiments and the modified examples that have been described above are merely an example, and the configurations described in the embodiments and the modified examples may be arbitrarily changed and/or arbitrarily combined to an extent that does not interfere with the function to be aimed. Furthermore, part of the functions that have been described in the embodiments and the modified examples may be omitted on condition that the necessary functions can be realized. For example, the terminal 110 may be realized by a plurality of terminals 110, and the terminal 110 may be a route setting device provided with the situation ascertainment unit 220 and the departure route setting unit 240. Moreover, the terminal 110 may be an autonomous traveling system provided with the vehicle control unit 260.

The present application is based upon and claims the benefit of priority from Japanese Patent Application No. 2020-211919, filed Dec. 22, 2020, and the entire disclosure of which is incorporated herein by reference.

The invention claimed is:
1. A route setting method comprising:
receiving an instruction for a work vehicle automatically moving in a field along a preset work route;

acquiring a position of the work vehicle;

generating, based on the instruction, the acquired position, and a type or model of work machine used for work in the field as the work vehicle automatically moves within the field, a departure route for the work vehicle to depart from a work region in which the work vehicle automatically performs the work in the field; and causing the work vehicle to automatically move along the departure route.

2. The route setting method according to claim 1, wherein:

generating the departure route includes selecting, based on the type or model of work machine, one region segment from among a plurality of region segments, each region segment of the plurality of region segments indicating a traveling region in which the work vehicle is allowed to automatically travel within the field; and an entire route of the departure route is included in the traveling region.

3. The route setting method according to claim 2, wherein a first region segment of the plurality of region segments includes, in the traveling region, a region in which the work has been finished at a time when the instruction is received.

4. The route setting method according to claim 3, further comprising:

deciding that the region in the preset work route is the first region segment, and wherein the region is from a start position to a position of the work vehicle at the time when the instruction is received.

5. The route setting method according to claim 2, wherein a second region segment of the plurality of region segments includes, in the traveling region, a region in which the work is yet to be finished at a time when the instruction is received.

6. The route setting method according to claim 5, further comprising:

deciding that the region includes the work that is yet to be finished, and wherein the region is from a position of the work vehicle at the time when the instruction is received to an end position in the preset work route.

7. The route setting method according to claim 2, wherein a third region segment of the plurality of region segments includes an entire area within the field as the traveling region.

8. The route setting method according to claim 7, wherein generating the departure route includes, based on selection of the third region segment from the plurality of region segments, generating the departure route as a shortest route from a position of the work vehicle at a time when the instruction is received to a departure position at which departure is made from the work region.

9. The route setting method according to claim 1, wherein the generating the departure route includes generating the departure route such that the work vehicle is oriented in a set departure direction at an ending point of the departure route.

10. A system comprising:

a situation ascertainment unit configured to:

receive an instruction for a work vehicle automatically moving in a field along a preset work route; and acquire a position of the work vehicle;

a departure route setting unit configured to generate, based on the instruction, the acquired position, and a type or model of work machine used for work in the field as the work vehicle automatically moves within the field, a departure route for the work vehicle to depart from a work region in which the work vehicle is configured to automatically perform the work in the field; and a control device that causes the work vehicle to automatically move along the departure route.

11. A non-transitory tangible storage medium storing a route setting program that, when executed by a computation device, causes the computation device to:

receive an instruction for a work vehicle automatically moving in a field along a preset route;

acquire a position of the work vehicle;

generate, based on the instruction, the acquired position, and a type or model of work machine used for work in the field as the work vehicle automatically moves within the field, a departure route for the work vehicle to depart from a work region in which the work is automatically performed in the field; and cause the work vehicle to automatically move along the departure route.

* * * * *